United States Patent [19]

Sanjana

[11] 3,989,573
[45] Nov. 2, 1976

[54] GLASS-EPOXY LAMINATES FOR HIGH TEMPERATURE USE

[75] Inventor: Zal N. Sanjana, Pittsburgh, Pa.

[73] Assignee: Westinghouse Electric Corporation, Pittsburgh, Pa.

[22] Filed: Apr. 24, 1975

[21] Appl. No.: 571,130

Related U.S. Application Data

[62] Division of Ser. No. 423,850, Dec. 11, 1973, Pat. No. 3,897,455.

[52] U.S. Cl. .................. 156/330; 260/2 EA; 260/47 EA; 260/59 EP; 260/830 TW; 428/413; 428/415; 428/417; 260/78.41
[51] Int. Cl.² .................. B32B 27/38; B32B 17/04
[58] Field of Search ............ 156/330; 428/415, 417, 428/413; 260/47 EA, 78.4 EP, 830 TW, 2 EA, 59 EP

[56] References Cited
UNITED STATES PATENTS

| | | | |
|---|---|---|---|
| 2,744,845 | 5/1956 | Rudoff | 428/415 X |
| 2,965,610 | 12/1960 | Newey | 260/47 EA |
| 3,071,496 | 1/1963 | Fromm et al. | 428/415 X |
| 3,212,958 | 10/1965 | Sellers | 428/415 X |
| 3,271,230 | 9/1966 | Johnson et al. | 428/415 X |
| 3,388,185 | 6/1968 | Goldberg et al. | 260/47 EA |
| 3,557,246 | 1/1971 | Foster | 156/330 X |
| 3,732,332 | 5/1973 | Curtis et al. | 260/47 EA |
| 3,794,555 | 2/1974 | Sanjana | 156/330 |
| 3,914,512 | 10/1975 | Barie et al. | 428/413 |

Primary Examiner—Harold Ansher
Attorney, Agent, or Firm—D. P. Cillo

[57] ABSTRACT

A laminate is made comprising a plurality of bonded layers of sheet material impregnated with a cured resinous composition, comprising a cured dispersion of an epoxy resin, NADIC methyl anhydride and benzophenonetetracarboxylic dianhydride.

6 Claims, 1 Drawing Figure

U.S. Patent  Nov. 2, 1976  3,989,573
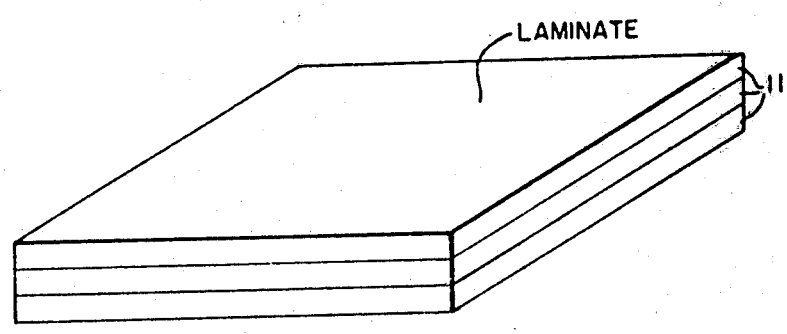

GLASS-EPOXY LAMINATES FOR HIGH TEMPERATURE USE

This is a division of application Ser. No. 423,850, filed Dec. 11, 1973, now U.S. Pat. No. 3,897,455.

BACKGROUND OF THE INVENTION

Glass reinforced, epoxy resin impregnated laminates, that retain good flexural strength at temperatures up to 200° C, are needed for slot liners and wedges in large rotating apparatus, and as copperclad printed circuit boards. The anhydride 3,3',4,4',-Benzophenone-tetracarboxylic dianhydride (BTDA), when used as a curing agent for bisphenol A type epoxy resins, has been known to impart superior high temperature resistance to the cured resin systems. Its use so far has been hampered, however, because it is not soluble to any extent in common solvents nor in epoxy resins, except at elevated temperatures where reaction occurs causing premature gellation of the resin system.

Barie and Franke, in *I & Ec, Prod. Res. & Dev.* Vol. 8, pg. 72, March 1969, "High Temperature Epoxy Resins Based On BTDA", describe uncatalyzed, BTDA hardened-epoxy resin pastes, with anhydride to epoxy equivalent ratios between 0.6 and 0.9 and a curing temperature of 200° C, for use as a metal adhesive, which can also contain filler particles. They also describe uncatalyzed, BTDA-maleic anhydride-epoxy resin casting compositions, with anhydride to epoxy equivalent ratios between 0.5 and 0.95, mixing temperatures of 150° C and a pot life of 5 to 10 minutes. These compositions having a curing temperature of about 200° to 220° C, and flexural strength values (ASTM D-790), after a 24 hour 200°C cure, of 13,200 psi after 5 weeks (A/E ratio 0.85). The BTDA-maleic anhydride is added to hot epoxy resin with stirring for 10 minutes until the BTDA goes into solution. These compositions have been suggested for use in high temperature laminates, but the high press temperatures necessary to cure, and the very poor pot life and/or prepreg shelf life would make the system commercially unfeasible. U.S. Pat. No. 3,794,555, assigned to the assignee of this invention, discloses BTDA-NADIC methylanhydride-epoxy resin solutions which are admixed at temperatures over 100° C to provide moderate BTDA inclusion. There is a need then for improved BTDA-epoxy systems with improved pot life and/or prepreg shelf life and very high BTDA loadings.

SUMMARY OF THE INVENTION

It has been found that the use of the maleic anhydride adduct of methyl cyclopentadiene (NMA or NADIC methyl anhydride), along with suspended BTDA, in an epoxy mixture, allows a subsequent reaction of the BTDA and NMA with the epoxy resin at temperatures below about 185° C. This is of commercial importance because most industrial steam presses operate at maximum temperatures of about 185° C. Non-presence of the NMA would require a reaction temperature of 225° C to 230° C. In the suspension, 98–100 percent of the BTDA remains undissolved.

The effective anhydride equivalent weight ratio of NMA:BTDA is a range from about 0.50 to 0.90:1, to provide a BTDA dispersion, and the effective equivalent weight ratio of anhydride (BTDA plus NMA): epoxy resin of the bisphenol A or novolac types, is a range from about 0.60 to 0.95:1, i.e. the anhydride content of the admixture is within the range of about 0.60 to 0.95 anhydride equivalents for each epoxy equivalent. When the ingredients are thoroughly admixed in these ranges, the BTDA will remain effectively dispersed in major amounts. The resulting homogeneous, stable, resinous composition, having a suspension stability of over 2 days at 25° C, can be diluted with solvent and used to impregnate glass fabric to provide, upon cure at about 170°–185° C, high temperature strength retaining laminates.

BRIEF DESCRIPTION OF THE DRAWING

For a better understanding of the invention, reference may be made to the preferred embodiment, exemplary of the invention, shown in the accompanying drawing.

DESCRIPTION OF THE PREFERRED EMBODIMENTS

The glycidyl polyether of a dihydric phenol, which may be employed in the invention, is obtainable by reacting epichlorhydrin with a dihydric phenol in an alkaline medium at about 50° C, using 1 to 2 or more mols of epichlorhydrin per mol of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

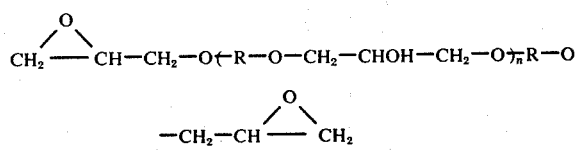

where $n$ is an integer of the series 0, 1, 2, 3..., and R represents the divalent hydrocarbon radical of the dihydric phenol. Typically R is:

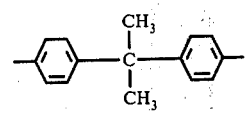

The glycidyl polyethers of a dihydric phenol used in the invention have a 1, 2 epoxy equivalency between 1.0 and 2.0. By the epoxy equivalency, reference is made to the average number of 1, 2 epoxy groups,

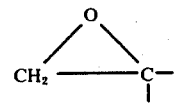

contained in the average molecule of the glycidyl ether. These glycidyl polyethers are commonly called bisphenol A type epoxy resins. Bisphenol A(p,p-dihydroxydiphenyl-dimethyl methane) is the dihydric phenol used in these epoxides.

Typical epoxy resins of bisphenol A are readily available in commercial quantities and reference may be made to the *Handbook of Epoxy Resins* by Lee and Neville for a complete description of their synthesis or to U.S. Pat. Nos.: 2,324,483; 2,444,333; 2,500,600; 2,511,913; 2,582,985; 2,615,007 and 2,633,458.

Other glycidyl ether resins that are useful and which can be used in place of or in combination with bisphenol A type epoxides in this invention include polyglycidyl ethers of a novolac. The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of nonvolac.

The product of the reaction is generally a massive oxidation resistance aromatic compound, one example of which is represented by the formula:

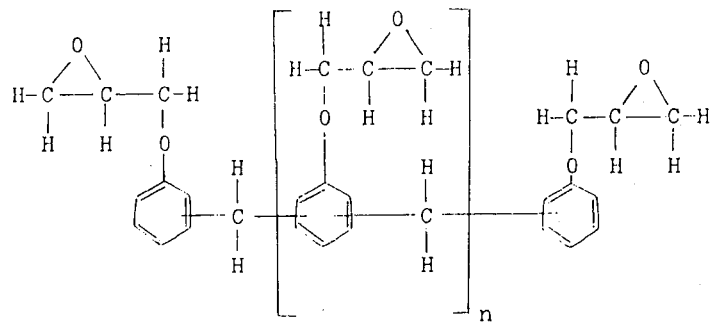

wherein $n$ is an integer of the series 0, 1, 2, 3, etc.

Although novolac resins for formaldehyde are generally preferred for use in this invention, novolac resins from any other aldehydes such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The glycidyl ether epoxy resins may be characterized by reference to their epoxy equivalent weight, which is defined as the mean molecular weight of the particular resin divided by the mean number of epoxy radicals per molecule. In the present invention, the suitable epoxy resins are characterized by an epoxy equivalent weight of from about 150 to about 250 for the bisphenol A type and from about 150 to about 210 for the epoxy novolacs. These two types of epoxy resins may be used alone or in mixtures. They are preferably low viscosity liquid resins, characterized by a viscosity range of about 2,500 to 20,000 cps. at 25°C for the bisphenol A type and about 1,500 to 20,000 cps. at 52°–55°C for the epoxy novolacs. Viscosities over these ranges require prolonged mixing at high temperatures which could result in premature gellation of the resin anhydride system.

The maleic anhydride adduct of methyl cyclopentadiene (NMA), used in the resinous compositions of this invention, commonly called NADIC methyl anhydride, (and also described as methylbicyclo [2.2.1] heptene-2, 3-dicarboxylic anhydride isomers, $C_{10}H_{10}O_3$, molecular weight of 178, anhydride equivalent weight of 178) normally a solid, is made into a light-yellow liquid having a melting point below 12° C by the addition of about 0.1 percent phosphoric acid. The liquid NMA has a viscosity of between about 175 to 225 cps. at 25° C and is miscible in all proportions with acetone, benzene, naphtha and xylene solvents.

Benzophenone-tetracarboxylic dianhydride (BTDA), used in the resinous compositions of this invention, is a white powder having a melting point of 236° C, a molecular weight of 322, and an anhydride equivalent weight of 161. It is known for its extremely poor solubility and has the structural formula shown:

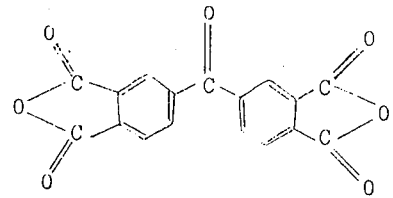

The BTDA particles, preferably between about 20 to 150 microns average diameter, are used in a liquid NMA, liquid epoxy resin system. The admixture must be thoroughly mixed, generally at room temperature, by a suitable means, such as a three roll mill, to subject the admixture to high shear forces, resulting in a high loaded, stable suspension of the BTDA in the epoxy-NMA mixture. The NMA in the dispersion admixture allows reaction of BTDA with epoxy resin at low temperature cure cycles of about 170° to 185° C. The slurry type system of this invention will contain about 98 to 100 percent undissolved BTDA. The NMA used will dissolve only up to about 2 weight percent of the total BTDA added. This system is admixed at temperatures below about 50° C, and preferably between 20° to 35° C, to insure a dispersion of BTDA particles rather than a solution of BTDA in epoxy-NMA. Long exposure to temperatures over 50° C will cause reaction of NMA with the epoxy resin and reduction of the otherwise excellent pot life.

The effective anhydride equivalent weight ratio of methylbicyclo [2.2.1] heptene-2,3-dicarboxylic anhydride: benzophenone-tetracarboxylic dianhydride, in the resinous composition of this invention, is a range from about 0.50 to 0.90:1. Anhydride equivalent weight means the mean molecular weight of anhydride divided by the mean number of anhydride groups per molecule. The effective equivalent weight ratio of benzophenone-tetracarboxylic dianhydride (BTDA) plus methylbicyclo [2.2.1] heptene-2,3-dicarboxylic anhydride (NMA): epoxy resin selected from the group consisting of bisphenol A epoxy resins and novolac epoxy resins, in the resinous composition of this invention, is a range of anhydride equivalent weight to epoxy equivalent weight of from about 0.60 to 0.95:1, i.e. the anhydride content (BTDA plus NMA) is within the range of from about 0.60 to 0.95 anhydride equivalents for each epoxy equivalent.

The viscosity of the resinous compositions of this invention are generally reduced by addition of the usual organic solvents, such as, for example, acetone, benzene, toluene, naphtha, and xylene alone or in mixtures, to give a solvent solution of resin having a viscosity between about 500 to 2,000 cps. at 25° C. Effective amounts of suitable catalysts or inhibitors may also be added to this solvent solution to increase or decrease the gell rate if desired. Particularly suitable catalysts are amines and imidazoles such as benzyldimethylamine and 2-ethyl, 4-methyl imidazole, to lower laminating time and provide better performance, while still retaining excellent pot life in the BTDA-NMA-epoxy system.

This solvent solution can be used to impregnate, or otherwise be applied to and coat, at least one layer and generally a plurality of layers of fibrous sheet material, shown as 11 in the drawing. The sheet material can be glass cloth or glass fibers, or fabrics prepared from synthetic resins such as nylon and linear polyethylene terephthalate resins. The preferred material is glass and most useful results are obtained in terms of high temperature capability and strength, when the cured resin composition constitutes about 20 to 40 weight percent of the final bonded laminate.

The impregnated fibrous sheet material is heated at between about 100° to 135° C for about 5 to 20 minutes to evaporate most of the solvent and substantially dry (B-stage) the resin impregnant to a tacky consistency. The sheet material is cut to size, stacked to give a laminate buildup of a plurality of sheet layers. The building may be heat and pressure consolidated in a press for about 1 to 5 hours at between about 170° to 185° C and about 75 to 350 psi, to finally cure the B-staged resin to a thermoset state and provide a unitary, bonded laminate. The resin may also be gelled in the press as an initial curing step for about 5 to 15 minutes. The laminate, generally between 1/16 to 1 inch thick will have an epoxy resin-anhydride content of between about 20 to 30 weight percent. The laminate may then be post heated if desired.

EXAMPLE 1

To 800 grams of a liquid polyglycidyl ether of phenol formaldehyde novolac, having an epoxy equivalent weight of 172–179 and a viscosity of 1,400–2,000 cps, at 52° C (sold commercially by Dow Chemical Co. under the tradename DEN 431) was added 280 grams of liquid NADIC methyl anhydride (NMA) having a viscosity of 175–225 cps, at 25° C. Then 372 grams of solid benzophenone-tetracarboxylic dianhydride (BTDA) was added to the NMA-epoxy resin mixture.

The three component admixture was homogenized with three passes through a three roll mill mixing means at 25° C, to uniformly disperse the BTDA and shear the BTDA particles to a certain extent by the high shear forces. The roller openings were between about 1/10 to 1 mil apart and the BTDA particles were about 325 mesh, 45 microns, average particle size diameter. The shearing broke up agglomerates and resulted in a stable suspension of the BTDA in the NMA-epoxy resin mixture with dissolution of no more than 2 weight percent of the BTDA.

In this condition the admixture had a pot life i.e. remained homogeneous and stable at room temperature, without settling, with little viscosity change, for about 9 days. This admixture provided an anhydride content of about 0.85 anhydride equivalents for each epoxy equivalent, and an anhydride equivalent ratio of NMA:BTDA of 0.66:1. A very high loading of BTDA resulted. This improves the strength retention at high temperatures.

The viscosity of the BTDA dispersion was reduced by adding 700 grams of acetone. In the diluted state the admixture was kept agitated to insure homogeneity. Twelve grams of 2-ethyl4 methyl imidazole was mixed as catalyst into the blend providing about 0.15 parts per hundred parts resin. Glass fabric (Style 181, with an amino silane finish) was dipped in the solvent solution of the resinous admixture dispersion, rolled between bars to remove excess liquid and then dried to B-stage (tacky) in a forced air oven for 8 minutes at 90°C. This essentially removed all of the acetone and initiated some reaction between the NMA and the resin. The impregnated fabric (prepreg) was very flexible and tacky and had a shelf life of 5 days at room temperature before the resin set and a shelf life of up to 8 weeks at 4° C.

The B-staged fabric was cut into 5 × 5 inch pieces and stacked to provide a 1/8 inch thick laminate build up which was placed between two stainless steel plates, inserted into a hot press and cured at 170° C for 1 hour at about 100 psi. BTDA-epoxy laminates without NMA would require a cure of about 225° C. The laminate was then post heated in an oven for 4 hours at 225° C and then 4 hours at 265° C. The ability to press cure at 170° to 180° C allows use of presses having low thermal capabilities such as steam heated presses.

The laminate was allowed to cool. It was solidly bonded together and had a solid resin content of about 28 weight percent. The laminate was tested for flexural strength (ASTM-D-790). The results were as follows and would have been somewhat higher if 1/16 inch laminates were used in the tests.

Table 5

| Test Condition | Flexural Strength |
| --- | --- |
| 225° C initial | 35,000 psi |
| 225° C after 168 hours at 225° C | 38,000 psi |
| 225° C after 6 weeks at 225° C | 43,000 psi |
| 225° C after 8 weeks at 225° C | 25,000 psi |
| 265° C initial | 12,000 psi |
| 265° C after 6 weeks at 265° C | 13,000 psi |

Note that the strength retention is over 100% after 6 weeks at 225° C and 265° C.

I claim:
1. A method of making a laminate comprising at least one layer of sheet material containing a cured resin comprising the steps of:
  1. admixing at a temperature of up to about 50° C:
    A. a mixture consisting essentially of:
      a. liquid epoxy resin, selected from the group consisting of a diglycidyl ether of bisphenol A having a viscosity range of about 2,500 cps. to about 20,000 cps. at 25° C and polyglycidyl ethers of a novolac having a viscosity range of about 1,500 cps. to about 20,000 cps. at 52° C to 55° C and mixtures thereof, and
      b. liquid NADIC methyl anhydride, with
    B. solid benzophenone-tetracarboxylic dianhydride, wherein the total anhydride plus dianhydride content is within the range of from about 0.60 to about 0.95 anhydride equivalents for each epoxy equivalent and the anhydride equivalent weight ratio of NADIC methyl anhydride: benzophenone-tetracarboxylic dianhydride is from about 0.50 to 0.90:1, to provide a homogeneous, stable dispersion of the solid dianhydride particles in the liquid without gellation, the dispersion containing about 98 percent to about 100 percent undissolved benzophenone-tetracarboxylic dianhydride;
2. adding organic solvent to the dispersion to give a solvent solution,
3. applying the solvent solution of the resinous admixture to a sheet material to coat or impregnate the material, and
4. curing the resin, to provide sheet material containing a solid resin.

2. The method of claim 10 wherein the cured resin constitutes about 20 to 40 weight percent of the laminate, the benzophenone-tetracarboxylic dianhydride has an average particle size of between about 20 to 150 microns and is shear mixed with the epoxy resin and NADIC methyl anhydride.

3. The method of claim 1 wherein an effective amount of catalyst is added between step (1) and step (3), the solvent is selected from the group consisting of acetone, benzene, toluene, naphtha, xylene and mixtures thereof, the solvent solution has a viscosity between about 500 to 2,000 cps. at 25° C, wherein admixing (A) and (B) in step (1) is at a temperature between about 20° to 50° C.

4. The method of claim 1 wherein the resin is cured by applying heat and pressure to the sheet material containing the solvent solution of the resin.

5. The method of claim 4, wherein a plurality of layers of sheet material containing applied solvent solution of the resinous admixture are stacked to give a laminate build up, and then heat and pressure consolidated to cure the resin to a thermoset state and provide a unitary, bonded laminate.

6. The method of claim 5 wherein the laminate is consolidated at a temperature of between about 170°–185° C.

* * * * *